INVENTOR.
ARTHUR R. CRAWFORD
BY THEODORE ONGARO
Corbett, Mahoney + Miller
ATTYS.

United States Patent Office 2,711,647
Patented June 28, 1955

2,711,647

VIBRATION ANALYZER

Theodore Ongaro and Arthur R. Crawford, Columbus, Ohio; said Arthur R. Crawford assignor to Lion Manufacturing Inc., Columbus, Ohio, a corporation of Ohio Application March 14, 1951, Serial No. 215,496

3 Claims. (Cl. 73—66)

Our invention relates to a vibration analyzer. More specifically, it relates to an electronic device for analyzing forces of vibration in rotating or moving parts or bodies.

In composite machines, embodying more than one rotating or moving part simultaneously operating at different speeds, detrimental vibrations may result from the unbalanced forces existing in any one or more of these parts. In order to eliminate the vibration, it is necessary to determine which of the various parts are creating it and how much each is creating. By eliminating each unbalance force in descending order of their magnitude, the resultant vibration can be reduced to any desired degree of perfection.

The prior art methods of measuring vibration give readings which are a product of both the amplitude and the frequency. This necessitates difficult and time-consuming calculations in order to determine which of the several moving parts is creating the greatest vibration. These prior art methods, even with calculations, do not necessarily disclose which part is creating this vibration.

One object of our invention is to provide a system for the rapid segregation of unbalance forces which produce unwanted vibration.

Another object of our invention is to provide a device which gives, simultaneously, on direct-reading meters, the amount of linear displacement due to vibration, and the speed or frequency of its occurrence.

Still another object of our invention is to provide means in the same device, but independent of vibration frequency, for determining the speed of any moving part without any mechanical connection therewith.

It is another object of our invention to provide a vibration analyzer for analyzing a complex vibration comprised of a plurality of component vibrations including a means for translating the complex vibration into a complex electrical signal having components which bear a fixed relation to the component vibrations which electrical signal is utilized to actuate means for determining which element in the machine under study is causing the component of the electrical signal having the maximum amplitude.

According to our invention, these objects are accomplished by means of a system employing a device which includes an electronic circuit for amplifying, segregating and interpreting the electric signal produced by a conventional vibration pick-up. The pick-up, having been placed upon the machine under study, responds to the vibration and produces a complex electrical signal the wave shape of which bears a fixed relation to the vibration. This signal is utilized by the circuit to: (1) visually isolate the offending part by means of a stroboscopic lamp fired in synchronism therewith (2) impress upon a calibrated meter the proportionate current created by the amplitude to read the linear displacement and (3) impress upon a second calibrated meter a current proportionate to the frequency at which the lamp is being fired. Once the part causing the greatest amount of vibration is isolated, it is then corrected by balancing or replacement and the operation repeated for each other part producing lesser magnitudes of vibration. The circuit can also be selectively set to eliminate the vibration pick-up and the amplitude indicating part of the circuit and to connect in the circuit an oscillator which will cooperate with the stroboscopic lamp to determine the speed of any moving part without any mechanical connection therewith and independent of the vibration frequency.

In the accompanying drawings, we have illustrated as an example, one electronic circuit arrangement in which the principles of our invention are embodied.

Figure 1:
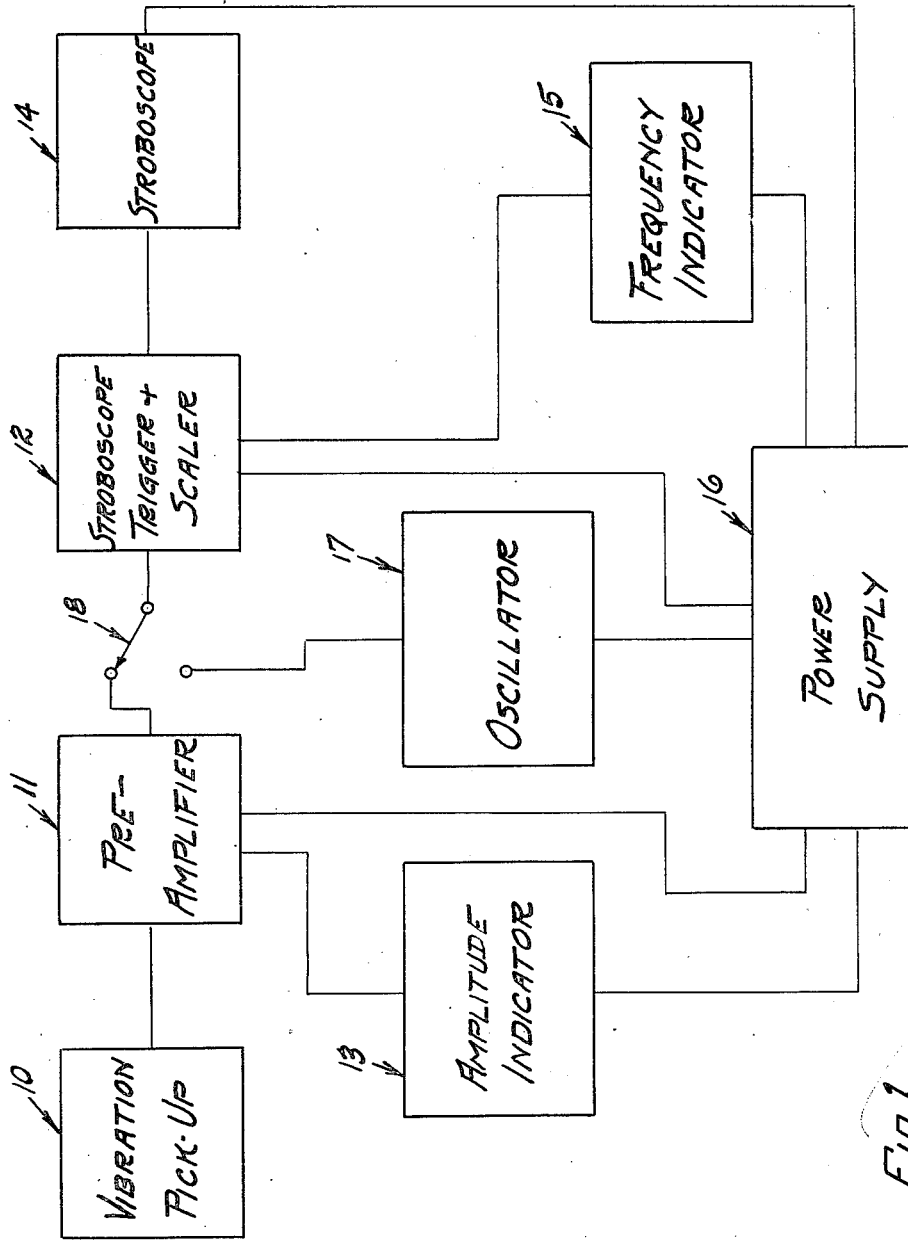
Figure 1 is a block diagram showing the relationship of the various basic units making up our analyzer.

The general relationship of the various units which make up our analyzer is illustrated in Figure 1. The electronic circuit comprises a vibration pick-up unit 10 which is connected to a pre-amplifier 11. The pre-amplifier 11 is connected to a stroboscope trigger and scaler 12 and an amplitude indicating unit 13. The stroboscope trigger and scaler 12 is connected to a stroboscope 14 and to a frequency indicating unit 15. A power supply unit 16 is connected to the pre-amplifier 11, to the stroboscope trigger and scaler 12, to the amplitude indicator 13, and to the frequency indicator 15. In addition, an oscillator 17 is provided which can be connected in the circuit when desired by means of a switch 18. The power supply unit 16 is also connected to the oscillator 17. In one position of the switch 18, as shown in Figure 1, the oscillator 17 is not connected in the circuit. In the other position of the switch 18, the oscillator is connected in the circuit with the stroboscope trigger and scaler 12, the stroboscope 14, and the frequency indicator 15, but is not connected to the vibration pick-up unit 10, the pre-amplifier 11, and the amplitude indicator 13, the latter units being out of the circuit.

Figure 2:
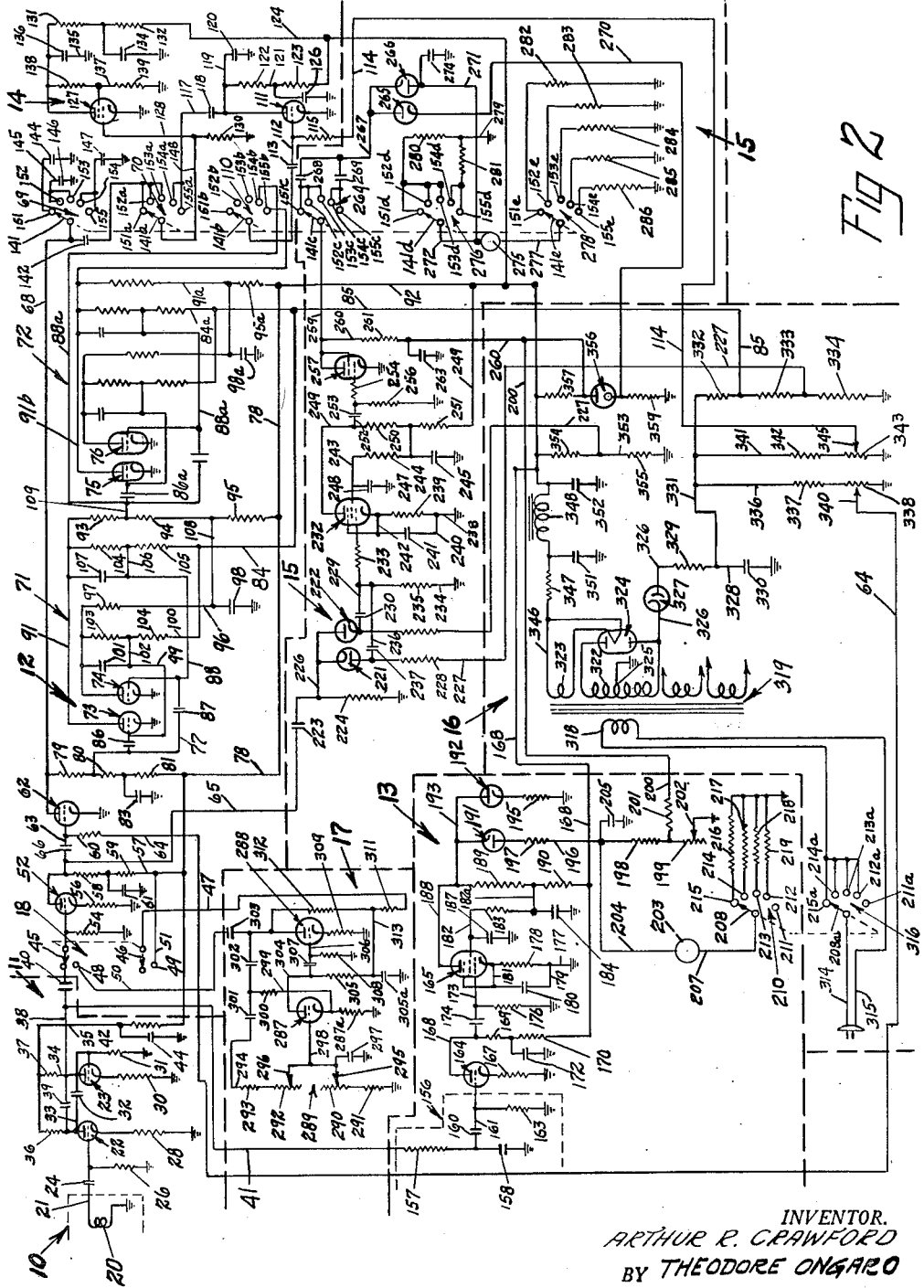
Figure 2 is a wiring diagram of the complete circuit of our analyzer.

With reference to Figure 2, we have illustrated the complete circuit of our analyzer. The units or sections of the circuit, corresponding to those illustrated in Figure 1, are separated by broken lines to facilitate description and understanding of the integrated circuit.

The vibration pick-up unit 10 may be of any suitable type, such as the seismic-mounted induction type. It is shown simply as a coil 20. It is adapted to be placed upon some part of the supporting structure of the machine which carries the moving parts creating vibration so that it will be caused to vibrate thereby. The electric signal produced in the pick-up as a result of the motion of vibration is transmitted to the pre-amplifier stage 11. In a piece of composite machinery containing several moving parts the vibration normally is of a complex nature and this complex vibration causes a conventional seismic pick-up to produce a complex electrical signal. Analysis shows that this complex electrical signal is composed of many component signals of different frequencies and amplitudes and these component signals bear a fixed relation to the vibration components which cause them.

The signal from the pick-up is carried through input lead 21 from grounded coil 20 of the vibration pick up into the pre-amplifier stage 11. The pre-amplifier 11, with its associated resistor and condenser network, is a high gain, low distortion amplifier stage, adequately decoupled from the common power supply by a suitable decoupling network. It includes the amplifier tubes 22 and 23 of the triode type, for example, which will receive the signal from unit 10 and produce therefrom a signal of usable level. A condenser 24 is interposed in the input lead 21, the lead being provided with a ground in which a resistance 26 is interposed. The lead 21 is connected to the grid of tube 22. The cathode of this tube is provided with a ground in which a resistance 28 is interposed. The cathode of tube 23 is provided with a ground in which resistance 30 is interposed. The grid of tube 23 is provided with a ground in which a resistance 31 is connected and this ground also serves for condenser 32 which is connected to a lead 33. The plates of tubes 22 and 23 are connected by the respective leads 33 and 34 to a line 35, the leads 33 and 34 having the respective resistances 36 and 37 interposed therein. An output line 38 connects with leads 33 and 34, a condenser 39 being in this line between the leads. Another condenser 40 is in this line at a point before it enters the stroboscopic trigger and scaler unit 12. An output line 41 leads from the line 38, to which it is connected ahead of condenser 40, and leads into the amplitude indicator unit 13. The line 35 in unit 11 is provided with a resistance 42 and a grounded condenser 44 is also connected to this line. The line 35 leads to the pre-amplifier 11 from the power supply unit 16a. The signal is coupled to the pre-amplifier stage 11 through the capacitor-resistor network 24 and 26. The pre-amplifier stage 11 is adequately decoupled from the power supply through line 35 by the decoupling network 42 and 44.

The switch 18 is provided between units 11 and 12. It comprises two movable contact arms 45 and 46 which are ganged together by a suitable connection indicated by the dotted line. Arm 45 is interposed in line 38 which leads on into unit 12. Arm 46 is connected to lead 47 which runs into the oscillator 17. The arms 45 and 46 may be swung from their positions shown in this figure to positions where they contact with the respective points 48 and 49. Point 48 is connected by lead 50 to unit 17 and point 49 is connected to lead 51 which goes on into unit 12. With the switch 18 in the position shown, the output from the pre-amplifier goes through line 38 into unit 12 for further amplification and use as will be described below.

The unit 12 includes an amplifying section comprising a tube 52, shown as a triode, and its network. The line 38 serves as the input line for this unit 12 and is connected to the grid of tube 52. Line 38 is grounded by a ground with a resistance 54 therein. The cathode of tube 52 is provided with a ground having a resistance 56 therein. The plate of tube 52 connects to a lead 57 which has resistances 58 and 59 therein. A ground is connected to lead 57, between the resistances, and has a condenser 61 connected therein. The lead 51 connects with lead 57 while the lead 57 connects to power line 35. With switch arm 45 in the position indicated, the signal is further amplified by tube 52 and is then transmitted to the triggering tube 62, shown as a triode, through line 63 that is connected to the grid of the latter tube. A power supply line 64 is connected to line 63 and runs from the power supply unit 16 and this line 64 has a resistance 60 therein. An output line 65 also connects to line 63 and runs into the frequency indicator 15. Thus, the signal amplified by tube 52 not only actuates triggering tube 62 but also is used in actuating unit 15. A condenser 66 is interposed in line 63 between the points of connection of lines 64 and 65. The plate of triggering tube 62 is connected to line 68 which leads to selector switches 69 and 70.

With switch 18 in the position shown, the signal is coupled through capacitor-resistor network 40 and 54 to the amplifier stage 52, which further amplifies the signal which is then differentiated by the capacitor-resistor network 60 and 66 and the resulting sharp positive pulse triggers the tube 62. The tube 52 receives its plate supply voltage through the load resistor 58 and decoupling resistor 59 which is by-passed by the decoupling condenser 61. The tube 62 thus fires on positive pulses from the differentiator circuit 60—66 and one positive pulse is obtained each time the signal passes through zero going positive making the stroboscope fire substantially in synchronism with that component of the complex electrical signal having the greatest amplitude. Applicants have found that if the lamp is made to fire in this manner, every time the electrical signal crosses the zero axis moving in a certain direction, the desired frequency of firing is obtained in most all practical situations. That is to say, when the light fires in this manner it has been found that it fires in synchronism with the component of the signal having the greatest magnitude.

In order to extend the frequency range of the stroboscope unit 14, two scaling circuit sections 71 and 72 are incorporated in the unit 12. The first scaling circuit section 71 consists of tubes 73 and 74, for example, triodes, and their associated capacitor-resistor network will give frequency division by two. The second scaling circuit section 72 consists of tubes 75 and 76, also shown as triodes, and their associated capacitor-resistor network and in conjunction with the first scaling circuit section 71 will give frequency division by four. Both scaling circuit sections 71 and 72 are decoupled from the common power supply. The input to section 71 is a lead 77 which connects to a line 78 that is connected to line 68. The line 78 is provided with resistances 79, 80 and 81, the lead 77 connecting between resistances 79 and 80, and a condenser 83 being connected to line 78 between resistances 80 and 81 and being grounded. The line 78 connects to a line 92 that leads from the power supply unit 16. The lead 77 connects with a condenser 86 which is connected to the grid of tube 73. In the lead 77 is a condenser 87 and this lead is connected to a line 88 which is connected to the grid of tube 74. The plate of tube 73 is connected to a line 91 which is connected to a power line 78. The line 91 is provided with the resistances 93, 94 and 95 and connects to power line 78. The plate of tube 74 is connected to grounded line 96 which has a resistance 97 and a condenser 98 therein. A branch line 99 connects the grid of tube 73 to line 96 at a point ahead of its connection to a branch line 100 which connects to a line 84 that connects with power line 85. The line 99 has a condenser 101 therein between its point of connection to line 96 and to a branch 102 which connects to line 100 between the resistances 103 and 104 therein. The line 84 also connects with line 91 and is provided with resistances 104 and 105 therein and between these resistances a branch 106 connects, this branch also connecting to line 88. Between its points of connection to lines 91 and 106, the line 88 is provided with a condenser 107. Just ahead of resistance 95, a branch 108 connects to line 91 and this branch is connected to line 96 ahead of condenser 98. This section 71 is adequately decoupled from the common power supply, through line 78, by the decoupling network 98 and 95.

The other scaler section 72 is substantially the same as section 71 and, therefore, will not be described in detail. A connection 109 connects the section 72 to section 71 between resistances 93 and 94 in line 91. The line 85 has a portion 84a equivalent to the portion of line 84 in scaler section 71. The line 92 has a portion 91a equivalent to the portion of line 91 in scaler section 71. The line 88a, which is substantially equivalent to lines 77 and 88 of section 71, connects to condenser 86a and leads to a selector switch 110. The line 91b also leads to this switch and it will be noted that line portions 84a and 91a are connected to line 91b. This section 72 is adequately decoupled from the common power supply, through line 92, by the decoupling network 98a and 95a.

The unit 12 also includes a second triggering tube 111, for example, a triode, and its associated capacitor-resistor network. The grid of this tube is connected by lead 112 to switch 110, a condenser 113 being interposed in this lead. This lead is connected by line 114 to the power supply unit 16, the line being provided with resistance 115. The plate of this tube is connected to the switch 70 by lead 117. The lead 117 is provided with condenser 118 and between condenser 118 and tube 116 a grounded condenser 120 is connected by lead 119. Connected to lead 119 is a branch line 121 which has resistances 122 and 123 therein and which is connected to a line 124. A grounded condenser 126 is connected to branch 121 between resistances 122 and 123. The line 124 runs from the stroboscope 14 to the power supply line 92 which leads from unit 16.

The stroboscope 14 includes the tube 127, for example, a tetrode, and its associated capacitor-resistor network. One of the grids of this tube is connected by lead 128 to switch 70, the lead being grounded by a ground which has a resistance 130 therein. The plate of this tube is connected to a continuation of line 124 which has resistances 131 and 132 therein, a grounded condenser 134 being connected between these resistances. Ahead of resistance 131, a grounded condenser 136 is connected to line 124. The other grid of tube 127 is connected to a ground line 137 between the resistances 138 and 139, the line 137 being connected to line 124 ahead of condenser 136.

The switch 69 is provided with movable contact arm 141 connected to line 68 ahead of condenser 142 therein. This arm cooperates with spaced contact points 151, 152, 153, 154 and 155. The contact point 151 is connected to a grounded condenser 144. The points 152 and 153 are connected to a grounded condenser 144. The points 154 and 155 are connected to a grounded condenser 147. The switch 70 is provided with movable contact arm 141a which is connected by lead 148 to line 128. This arm cooperates with contact points 151a, 152a, 153a, 154a and 155a. Points 151a, 152a and 153a are connected to line 68. Points 154a and 155a are connected to lead 117. The switch 110 is provided with movable contact arm 141b which is connected to lead 112 and which cooperates with contact points 151b, 152b, 153b, 154b and 155b. The point 154b is connected to line 88a while the point 155b is connected to line 91b.

The tube 62 is triggered in the manner previously described and the signal from the triggering tube 62 fires the stroboscopic tube 127. In the first three positions of switches 69, 70 and 110, the signal from tube 62 fires the stroboscopic tube 127 by means of a sharp negative impulse through its associated capacitor-resistor network 130 and 142. These first three positions of the switches are used to select the appropriate discharge capacity for the triggering tube 62 in the various speed ranges. In the fourth and fifth positions, of the switches, the stroboscope is triggered by the tube 111.

With the switches 69, 70 and 110 in the positions indicated in Figure 2, the triggering tube 62 fires the stroboscopic tube 127 for speed ranges within the operating limits of such stroboscopic tube. It will be noted that output line from tube 62, at this time, is connected directly to the grid of stroboscopic tube 127 through line 68, point 151a and arm 152a of switch 70, lead 148 and lead 128. Also, the output line 88a from scaler section 71 and the output line 91b from scaler section 72 are dead at this time since they are connected to the respective contact points 154b and 155b of switch 110. Speed ranges above these normal limits are scaled either by two, through the scaler section 71, or by four through the combined scaler sections 71 and 72. As indicated above, the scaling is accomplished by proper selective setting of the switches 69, 70 and 110 in their fourth and fifth positions. As indicated by the dotted line, the switch arms 141, 141a and 141b are ganged together for simultaneous movement. To connect only the scaler section 71 in the circuit to obtain a frequency division of two, the switch arms 141, 141a and 141b are moved into their fourth positions in contact with their respective contact points 154, 154a and 154b. This connects output line 88a, for section 71, which by-passes section 72, to line 112, through arm 141b, to actuate tube 111 and cause it to fire stroboscopic tube 127 through lead 117, arm 141a of switch 70, which is in contact with point 154a, and line 128. At this time, the output line 68 of tube 62 is dead because arm 141 of switch 69 is in contact with grounded point 154. Also, output line 91b for scaler section 72 is dead because it is connected to the dead point 155b of switch 110. To connect both the scaler sections 71 and 72 in the circuit, the arms 141, 141a and 141b are advanced into their fifth positions in contact with their respective contact points 155, 155a and 155b. At this time, output line 68 for triggering tube 62 is still dead because arm 141 contacts the grounded point 155. Output line 88a for section 71 is now dead because it is connected to dead point 154b. However, output line 91b, which now serves for both sections 71 and 72, is now connected to line 112, through arm 141b, which contacts point 155b, and will actuate triggering tube 111. This tube will fire tube 127 through line 117, arm 141a, which is in contact with point 155a, lead 148, and line 128.

Thus, with one setting of switches 69, 70 and 110, the triggering tube 62 fires the stroboscopic tube 127 directly. With another setting of the switches, the scaler section 71 is connected in the circuit, the triggering tube 62 is disconnected from the circuit, and the triggering tube 111 is connected in the circuit for firing stroboscopic tube 127. With still another setting of the switches, both the scaler sections 71 and 72 are connected in the circuit, the triggering tube 62 is disconnected from the circuit and the triggering tube 111 is connected in the circuit for firing stroboscopic tube 127. With this arrangement the limitation of tube 127 to relatively lower speeds is overcome and it should be understood that additional scaler sections could be used so that the stroboscopic tube could be employed at still higher speeds.

The other output line 41 from the pre-amplifier 11, as previously indicated, connects to the amplitude indicating unit 13. This channel includes an integrator section 156, indicated by the dotted lines comprising a capacitor-resistor network. This section includes a resistance 157 and a grounded condenser 158 in the line 41. A second condenser 160 is provided in lead 161 which connects to line 41 between resistance 157 and condenser 158. Beyond condenser 160, a ground line is connected to line 161 and has a resistance 163 therein. The integrator section comprises a translator for translating the complex electrical signal into a form which will permit the amplitude indicating unit to give a true indication of vibration amplitude.

The unit 13 also includes amplifying tubes 164 and 165, the formed being shown as a triode and the latter as a pentode, and their associated capacitor-resistor networks. The lead 161 connects to the grid of tube 164. The cathode of this tube is connected to a grounded resistance 167. The plate of this tube is connected to line 168 which runs from the power unit 16. This line 168 has the resistances 169 and 170, in unit 13, between which a grounded condenser 172 is connected. Ahead of resistance 169, a lead 173 connects with line 168 and leads to one grid of tube 165, this lead being provided with condenser 174. Between condenser 174 and tube 165, a grounded resistance 176 connects to lead 173. The cathode of tube 165 is grounded by line 177 which has a resistance 178 therein. A lead 179 runs from one of the other grids to line 177 beyond resistance 178 and is provided with a condenser 180. A branch 181 connects to lead 179, ahead of condenser 180 and to a lead 177, ahead of resistance 178. The final grid of tube 165 is connected to a line 182 which is provided with resistance 183 and a condenser 184, and which is grounded. Ahead of resistance 183, a grounded condenser 187 is connected to line 182. The plate of tube 165 is connected by branch line 188 to power line 168. The line 188 is provided with resistances 189 and 190 and a branch 182a from line 182, between resistance 183 and condenser 184, connects to line 188 between these resistances.

The output of the tubes 164 and 165 is conducted to the signal-metering tubes 191 and 192, which are shown in the form of diodes by a lead 193 which connects to line 188. Lead 193 is connected to the cathode of tube 191 and to the plate of tube 192. The cathode of tube 192 is connected to a grounded resistance 195. The plate of tube 191 is connected to line 196 which has the resistances 197, 198 and 199 therein. A power line 200 from unit 16 connects to line 196 between resistances 198 and 199. Line 200 is provided with a resistance 201 adjacent its connection to line 196. A movable grounded contact 202 is associated with resistance 199.

A meter 203 is provided for reading the final output of this unit 13. This meter is connected by lead 204 to line 196 and a grounded condenser 205 and by lead 207 to a movable contact arm 208 of a range-selecting switch 210. The switch 210 is provided with the contact points 211, 212, 213, 214 and 215. Connected to the points 212, 213, 214 and 215 are the respective resistances 216, 217, 218 and 219, which are all grounded, these resistances successively increasing in value. By means of the switch arm 208 and the associated resistances 216–219, the sensitivity of meter 203 can be controlled so that it will be suitable for registering various desired ranges of amplitudes, it being understood that the greater the resistance, the more sensitive is the meter 203. Adjustment of arm 202 varies the effect of resistance 199 for the purpose of varying the power supply for tube 191.

The signal from the pre-amplifier 11 is supplied to unit 13 through line 41 and is integrated by the capacitor-resistor network 157 and 158 and coupled to the tube 164 by means of the capacitor-resistor network 160 and 163. The amplifying stage, composed of tube 164 and its associated capacitor-resistor components, is a low frequency amplifier circuit which is also decoupled from the common power supply, through line 168, by the decoupling network 170 and 172. The signal from this amplifying stage is coupled to the final amplifying stage, consisting of tube 165 and its associated capacitor-resistor components by means of the network 174 and 176. The resulting signal from this amplifying stage is rectified by means of tube 191 and the resulting D. C. potential is indicated by means of the meter 203 and the selected resistances 216, 217, 218 or 219, being proportional to the amplitude of the vibration of the pick-up 10.

The frequency or R. P. M. indicating unit 15 receives a signal from the tube 52 through the line 65. This unit includes a limiter circuit which consists of the two tubes 221 and 222, shown as diodes, and an associated capacitor-resistor network. The line 65 includes the condenser 223 and the grounded resistance 224. A lead 226 from line 65, between condenser 223 and 224, connects to the cathode of tube 221 and to the plate of tube 222. The plate of tube 221 is connected to power line 227, which leads from the power unit 16, and this line includes the resistance 228. The cathode of tube 222 is connected to the power line 227 which leads from unit 16. Connected to line 227 and the cathode of tube 222 is a lead 229, which includes condenser 230, and this lead connects to one of the grids of a tube 232, shown as a pentode, a resistance 233 also being in the lead 229. Connected to lead 229, between condenser 230 and resistance 233 is a grounded line 234 having the resistance 235 therein. A branch line 236 connects to line 227, ahead of resistance 228, and to line 234 ahead of resistance 235, this branch including the condenser 237.

The tube 232 serves as an amplifying tube and its cathode is grounded by line 238 which includes the resistance 239. Beyond resistance 239, a lead 240 connects to line 238 and leads to one of the other grids of tube 232. The lead 240 includes condenser 241. A branch 242 is connected to lead 240, ahead of condenser 241, and to ground line 238 ahead of resistance 239. The remaining grid of tube 232 is connected to line 243 which is provided with resistance 244, and grounded condenser 245. Ahead of resistance 244, a grounded condenser 248 connects to line 243. The plate of tube 232 is connected to line 249 which connects to line 92 leading from power unit 16, this line 42 including resistances 250 and 251. Ahead of resistance 250, a lead 252 connects to line 249 and includes a condenser 253 and a resistance 254. A grounded resistance 256 connects to lead 252, between condenser 253 and resistance 254.

The unit 15 also includes a square wave generator which receives the amplified signal from tube 232. This generator includes the tube 257, for example a tetrode, and the lead 252 for the amplified signal is connected to one of the grids of this tube. The other grid and the plate of this tube are connected to line 259 which connects to a line 260 leading from the power unit 16. The line 260 includes resistance 261 and beyond this resistance is connected a grounded condenser 263. The line 259 is also connected to a selector switch 264.

The unit 15 also includes the signal-metering tubes 265 and 266 shown as diodes. The plate of tube 265 and the cathode of tube 266 are connected to a lead 267, running from the switch 264, and between the switch and lead 267, the condensers 268 and 269 are provided. The cathode of tube 265 is connected to a power line 270 which runs from the power unit 16. The plate of tube 266 is connected to a line 271 which connects with a line 272. A grounded condenser 274 connects to line 271. The line 272 connects the meter 275 to a selector switch 276 and a line 277 connects this meter to a selector switch 278.

The selector switch 264 includes the movable contact arm 141c which cooperates with the five contacts 151c, 152c, 153c, 154c and 155c. All of these contacts are connected to line 267. The selector switch 276 includes the movable contact arm 141d, which is connected to line 272, and the associated fixed contact points 151d, 152d, 153d, 154d, and 155d. All of these contacts are grounded by a grounding branch 279 which includes resistances 280 and 281. The selector switch 278 includes the movable contact arm 141e which cooperates with the fixed contact points 151e, 152e, 153e, 154e, and 155e. These fixed contact points 151e–155e are connected to the respective grounded resistances 282, 283, 284, 285 and 286. It will be noted, as indicated by the dotted line, that the switch arms 141c, 141d and 141e are ganged together with each other and with the switch arms 141, 141a and 141b of the respective switches 69, 70 and 110.

The unit 15 receives the signal from the tube 52 through line 65. The signal is coupled by means of the capacitor-resistor network 223 and 224 into the limiter circuit consisting of tubes 221 and 222 and their associated components. These tubes eliminate the noise level in the circuit so that the frequency meter 275 responds only to the input signal. The resulting signal passed by the limiter circuit is amplified by the high gain stage, consisting of tube 232 and its associated components, which is decoupled from the common power supply, through line 249, by the capacitor-resistor network 245 and 251. The highly amplified signal from stage 232 is coupled to the tube 257 by means of the capacitor-resistor network 252, 254 and 256. This signal drives the tube 257 from cut-off to plate current saturation for all input signals in the useful range of our device. This resulting square wave, which is independent of signal amplitude, is coupled through arm 141c of switch 69 to condenser 268 or 269, depending upon whether it contacts with the first three points 151c, 152c and 153c, or the fourth and fifth points 154c and 155c, so that the charging and discharging currents of the condensers 268 and 269 are sorted by the tubes 265 and 266 with a resulting D. C. potential proportional to frequency. This is read on meter 275. Arms 141c and 141d are moved relative to their respective contact points 151c—155c and 151d—155d to select the appropriate capacitor-resistor value for the desired frequency range and arm 141e is moved relative to points 151e—155e to select the correct meter-multiplier resistances 282—286. The resistances 282—286 are of such values that in conjunction with connected parts of the circuit, the resistance is gradually increased as arm 141e is moved into contact with the successive points 151e—155e.

The adjustment of the range of unit 15 occurs simultaneously with the adjustment of triggering and scaling unit 12 to adjust the operating limits of the stroboscopic unit 14 because all of the switches 69, 70, 110, 264, 276 and 278 are connected together, as indicated above, for simultaneous operation. As the range of unit 14 is increased by successively connecting in the circuit the scaler sections 71 and 72 of unit 12, the range of unit 15 is simultaneously increased.

The internal oscillator 17 is provided for independent strobatron study. When the switch arms 45 and 46 of switch 18 are moved into contact with the respective points 48 and 49, the oscillator 17 functions. Movement of arm 45 disconnects the pre-amplifier 11 and the vibration pick-up 10 and the amplitude indicator 13 from the circuit and connects line 50 to line 38 leading into unit 12. Movement of arm 46 connects line 47 to line 51 leading into unit 12 and thus provides a power supply for unit 17. The lines 47 and 50 are connected in the oscillator circuit. The oscillator circuit is a Wein-bridge circuit consisting of tubes 287 and 288, shown as triodes, and their associated capacitor-resistor network. The Wein-bridge circuit includes the dual potentiometer 289. This potentiometer consists of a pair of grounded resistances 290 and 291 and a pair of resistances 292 and 293 connected in a line 294. Coperating with resistances 290 and 292, respectively, are the adjustable contacts 295 and 296 which are connected together and to a lead 298 which leads to the grid of tube 287. A grounded condenser 297 is connected to contacts 295 and 296. The cathode of tube 287 is connected to grounded resistance 287a. The cathode is also connected by lead 299, which contains resistance 300, to line 294 between the condensers 301 and 302. The line 294 connects to line 50 beyond the condenser 303 therein. The plate of tube 287 is connected to a ground line 304 which includes a resistance 305 and a condenser 305a. Ahead of resistance 305, a lead 306 is connected to line 304 and includes a condenser 307 which is connected to the grid of tube 288. A grounded resistance 308 is connected to lead 306 between condenser 307 and the grid of tube 288. The plate of tube 288 is connected to line 50 while the cathode of this tube is connected to a grounded resistance 309. The line 47 connects to line 50 between the plate of tube 288 and the point of connection of line 294. This line 50 includes the resistances 311 and 312. A branch 313 connects to line 50 between resistances 311 and 312 and to ground line 304 between resistances 305 and condenser 305a.

This oscillator unit 17 permits speed determination of any part of the machine to be analyzed by controlling the oscillations of tube 287 so as to cause the flashes of stroboscopic tube 127 to synchronize with the frequency or R. P. M. of the moving part of the machine being analyzed. The speed of oscillation of the tube 287 is varied by the potentiometer 289. The resulting signal is amplified by tube 288 and the output signal is fed through line 50 into the stroboscopic trigger and scaler unit 12. This unit 12 triggers the stroboscopic tube 127 of unit 14, and through the frequency indicating unit 15 the frequency of the oscillations is read on meter 275. It should be noted that the output from the oscillator circuit is not connected to the amplitude circuit 13 but is connected to the frequency unit 15 through unit 12 so that the frequency is read directly on meter 275.

The power supply unit 16 consists mainly of a full-wave rectifier tube 324 and a half-wave rectifier tube 327 and associated circuits. The full-wave circuit supplies the required positive D. C. voltages for the various channels and the half-wave circuit provides the required negative D. C. voltages for the scaling circuits and for the triggering tubes 62 and 111. The main power leads 314 and 135 connect to a suitable A. C. source. Associated with line 314 is the master switch 316 which includes movable contact arm 208a connected to the line and associated fixed contact points 211a, 212a, 213a, 214a and 215a, all but the first being connected to line 314. The contact arm 208a of switch 316 and the arm 208 of switch 210 are connected together, as indicated by the dotted line for simultaneous movement. Thus, as the master switch 316 is thrown on by movement of arm 208a from point 211a, into engagement with any of points 212a-215a, the arm 208 will move from point 211 into engagement with any of points 212-215 which is selected to obtain a suitable range for unit 13. Connecting arms 208a to arm 208 insures that the meter 203 will not be overloaded suddenly since the highest resistance 216 is first connected in the circuit. The lines 314 and 315 are connected to the primary coil 318 of a transformer 319. The full-wave rectifying tube 324 includes a filament connected to coil 323 and plates connected to secondary coil 322 of the transformer, the coil 322 having a grounded center tap 325. The line 326 leading from coil 322 is connected to the half-wave rectifying tube 327. A line 328 leads from member 327 and includes resistance 329 and grounded condenser 330. A line 331 connects to line 328, between resistance 329 and condenser 330, and this line has the three resistances 332, 333 and 334 therein and is grounded. The line 85, which supplies power to tube 75 of unit 12, connects to line 331 between resistances 332 and 333. The line 227, which supplies power to tube 221 of unit 15, connects to line 331 between resistances 333 and 334. Connected to line 331 is a line 336 which is provided with resistances 337 and 338 and is grounded. A movable contact 340 cooperates with resistance 338 and is connected to line 64 which supplies bias to tube 62 of unit 12 and the bias supplied through this line may be varied by setting contact 340 as desired. Another line 341 is connected to line 331 and is provided with resistance 342 and resistance 343, and is grounded. Movable contact 345 is associated with resistance 343 and is connected to line 114 which supplies bias to tube 111 of unit 12, this bias being variable by the setting of contact 345.

The line 346 leading from coil 323 is provided with a resistance 347 and connects to a choke coil 348 and on opposite sides thereof to grounded condensers 351 and 352. The line 92, which supplies power to the scaler sections 72 of unit 12 and to line 249 of unit 15, also connects with coil 348 and condenser 352. The line 168, which supplies power to tube 164 of unit 13, connects to the line 92. Another grounded line 353 connects to line 92 and is provided with resistances 354 and 355 between which the line 227, which supplies power to tube 221 of unit 15, connects. A full wave rectifying tube 356 has its plate connected to line 260, which supplies power to tube 275 of unit 15, and to line 92 by resistance 357. The cathode of this tube is connected to grounded resistance 359 and to line 270, which supplies bias to tube 265 of unit 15.

In order to further clarify the use of our device to analyze vibration in a machine having several rotating or moving parts operating at different frequencies, a typical operation procedure follows:

The pick-up 10 is placed upon a convenient portion of the supporting structure of the machine. The device, having been connected to a suitable electrical power source by plug 314, is energized by rotating switch 316 from the "off" position to the first position in a counter-clockwise direction. Switch 316 serves as a control for the "on-off" power supply, and also actuates switch 210. Arm 208 of switch 210 engages any one of the series of contacts 211a–215a, which through the various resistances 216–219, determine the appropriate amplitude range of unit 13. These resistances are arranged in an ascending order of sensitivity as the arm is turned in a counter-clockwise direction. Selector switch 18 is placed in the position shown in Figure 2 which connects the pick-up 10 into the circuit. The switches 69, 70 and 110 are selectively set for the range most appropriate for the frequencies being studied.

The strob lamp 127 is now directed at each moving part, one part at a time. Since the strob is fired substantially in synchronism with the frequency of the part creating the greatest vibration, that part will be visually stationary while the others will appear to be moving at various rates.

The frequency or speed of this part is then read directly on the frequency meter 275 and the resulting linear displacement is read directly on the displacement meter 203.

With the offending part removed, replaced or corrected, the procedure is repeated for each other moving part, in the descending order of the magnitude of their vibration until the desired degree of perfection is attained as is indicated on the amplitude meter 203.

Since the strob-firing by the pick-up 10 is actuated by that part creating the greatest vibration and since it is frequently desirable to accurately determine the speed or frequency of other of the moving parts, as well as visually observing such parts during actual operation, the oscillating unit 17 is provided for manually-controlled firing of the strob tube 127. When it is desired to use this oscillating circuit, the selector switch 18 is turned from the pick-up input position shown to swing arms 45 and 46 to their other or oscillator position. The strob tube 127 is now fired by the oscillator 17 at any desired frequency, within the limits of the circuit, by means of a control knob which actuates the variable resistors 295 and 296. By turning the control knob until the moving object is visually stationary, the oscillator is now in synchronism with that object and its frequency can be read directly on meter 275.

It will be apparent that we have provided a device which can be used in rapidly segregating unbalanced forces, in moving bodies, which produce unwanted vibration. The device gives, simultaneously, on direct-reading meters, the amount of linear displacement due to vibration, and the speed or frequency of its occurrence. The same device can also be used in determining the speed of any moving part without any mechanical connection therewith and independent of vibration frequency.

Having thus described our invention, what we claim is:

1. In an apparatus for analyzing and reducing vibration in a machine having a plurality of moving parts; an electrical pickup adapted to be engaged with said machine for producing a complex electrical signal having components which bear a fixed relation to the components of said vibration, amplifying means having its input directly connected to said pick-up so that the signal reaching said input is subject to no time delay other than phase shift, sharp pulse producing means including differentiating means connected to said amplifying means and producing a sharp pulse each time said complex signal passes through zero moving in a given direction, a stroboscopic lamp connected to said pulse producing means, said pulses firing said lamp substantially in synchronism with the component of said electrical signal having the maximum amplitude, an integrating circuit connected to said amplifying means, a first meter, means including rectifying and amplifying means connected to said integrating circuit and to said meter to cause said meter to accurately read the absolute amplitude of the complex vibration, a second meter, and rectifier means connected to said second meter and to the circuitry between said pick-up and lamp to cause said meter to indicate the frequency at which said lamp fires.

2. In an apparatus for analyzing and reducing vibration in a machine having a plurality of moving parts; an electrical pickup adapted to be engaged with said machine for producing a complex electrical signal having components which bear a fixed relation to the components of said vibration, a low distortion amplifying means connected to said pickup, further amplifying means connected to said low distortion amplifying means, sharp pulse producing means including differentiating means connected to said amplifying means and producing a sharp pulse each time said complex signal passes through zero moving in a given direction, a stroboscopic lamp connected to said pulse producing means, said pulses firing said lamp substantially in synchronism with the component of said electrical signal having the maximum amplitude, an integrating circuit connected to said amplifying means, a first meter, means including rectifying and amplifying means connected to said integrating circuit and to said meter to cause said meter to accurately read the absolute amplitude of the complex vibration, a second meter, and rectifier means connected to said second meter and to the circuitry between said pickup and lamp to cause said meter to indicate the frequency at which said lamp fires.

3. In an apparatus for analyzing and reducing vibration in a machine having a plurality of moving parts; an electrical pickup adapted to be engaged with said machine for producing a complex electrical signal having components which bear a fixed relation to the components of said vibration, a low distortion amplifying means connected to said pickup, further amplifying means connected to said low distortion amplifying means, sharp pulse producing means including differentiating means connected to said amplifying means and producing a sharp pulse each time said complex signal passes through zero moving in a given direction, a stroboscopic lamp connected to said pulse producing means, said pulses firing said lamp substantially in synchronism with the component of said electrical signal having the maximum amplitude, an integrating circuit connected to the circuitry between said pickup and said lamp, a first meter, means including rectifying and amplifying means connected to said integrating circuit and to said meter to cause said meter to accurately read the absolute amplitude of the complex vibration, a second meter, and rectifier means connected to said second meter and to the circuitry between said pickup and lamp to cause said meter to indicate the frequency at which said lamp fires.

References Cited in the file of this patent

UNITED STATES PATENTS

| Number | Name | Date |
|---|---|---|
| 2,092,096 | Swedlund | Sept. 7, 1937 |
| 2,127,605 | Kucher et al. | Aug. 23, 1938 |
| 2,165,024 | Baker et al. | July 4, 1939 |
| 2,251,436 | Bentley et al. | Aug. 5, 1941 |
| 2,301,291 | Kolesnik | Nov. 10, 1942 |
| 2,331,317 | Germeshausen | Oct. 12, 1943 |
| 2,361,281 | Gibbs | Oct. 24, 1944 |
| 2,361,990 | Brown | Nov. 7, 1944 |
| 2,521,141 | Allen | Sept. 5, 1950 |
| 2,616,288 | Mesa | Nov. 4, 1952 |